United States Patent
Naveh (10) Patent No.: US 10,152,466 B2
(45) Date of Patent: Dec. 11, 2018

(54) COMPARING USER INTERFACES

(71) Applicant: HEWLETT-PACKARD DEVELOPMENT COMPANY, L.P., Houston, TX (US)

(72) Inventor: Yaron Naveh, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 259 days.

(21) Appl. No.: 14/898,594

(22) PCT Filed: Jul. 31, 2013

(86) PCT No.: PCT/US2013/053062
§ 371 (c)(1),
(2) Date: Dec. 15, 2015

(87) PCT Pub. No.: WO2015/016921
PCT Pub. Date: Feb. 5, 2015

(65) Prior Publication Data
US 2016/0132469 A1    May 12, 2016

(51) Int. Cl.
*G06F 17/22* (2006.01)
*G06F 9/451* (2018.01)
*G06F 8/38* (2018.01)
*G06F 8/71* (2018.01)

(52) U.S. Cl.
CPC ............ *G06F 17/2288* (2013.01); *G06F 8/38* (2013.01); *G06F 8/71* (2013.01); *G06F 9/451* (2018.02); *G06F 17/2247* (2013.01)

(58) Field of Classification Search
CPC ..... G06F 11/263; G06F 17/2288; G06F 9/451
USPC ......................................... 714/38.1; 715/764
See application file for complete search history.

(56) References Cited

U.S. PATENT DOCUMENTS

| | | | |
|---|---|---|---|
| 6,557,100 B1 | 4/2003 | Knutson | |
| 6,701,514 B1 | 3/2004 | Haswell et al. | |
| 6,898,764 B2 | 5/2005 | Kemp | |
| 7,945,589 B1 | 5/2011 | Weiss | |
| 8,881,109 B1 * | 11/2014 | Bridges, Sr. | G06F 11/263 714/38.1 |
| 2005/0204047 A1 | 9/2005 | Mitchell et al. | |
| 2007/0130376 A1 | 6/2007 | Moon | |
| 2008/0034307 A1 | 2/2008 | Cisler et al. | |
| 2008/0148235 A1 | 6/2008 | Foresti et al. | |
| 2013/0036367 A1 | 2/2013 | Deroos et al. | |

FOREIGN PATENT DOCUMENTS

EP    2477123 A2    7/2012

OTHER PUBLICATIONS

Cryer, J., CSS Regression Testing, Apr. 16, 2013, 4 pages http://tldr.huddle.com/blog/css-testing/.
(Continued)

*Primary Examiner* — Andrey Belousov (57) ABSTRACT

Comparing user interfaces (UIs) can refer to comparing information pertaining to a portion of a UI associated with an event with information pertaining to one of a plurality of previous version of the UI and/or identifying, based on the comparison, a revision to the one of the previous version of the UI that caused the event.

13 Claims, 4 Drawing Sheets

(56) References Cited

OTHER PUBLICATIONS

Ekart, G. Perceptual Testing for Safer Continuous Deployment, Jan. 20, 2013, 13 pages, http://www.infoq.com/news/2013/06/pdiff.
Eliminate Boring Testing: Automating Visual Comparison, Apr. 23, 2012, 7 pages http://trishkhoo.com/2012/04/eliminate-boring-testing-automating-visual-comparison/.
International Search Report and Written Opinion, dated Apr. 30, 2014, PCT Patent Application No. PCT/US2013/053062, 12 pages.

\* cited by examiner

COMPARING USER INTERFACES

CROSS-REFERENCE TO RELATED APPLICATION

This application is a U.S. National Stage Application of and claims priority to international Patent Application No. PCT/US2013/053062, filed on Jul. 31, 2013, and entitled "COMPARING USER INTERFACES".

BACKGROUND

Business processes may be a factor in the operational success of an organization. The business processes may be implemented using applications and/or user interfaces. As such, the organization may have an interest in ensuring that the applications and/or the user interfaces operate properly (e.g., as intended). Therefore, the organization may evaluate issues associated with an application and/or a user interface related to application.

DETAILED DESCRIPTION

Applications, such as web applications, can utilize user interfaces (UIs) to provide information to users and/or receive information from users. For example, UIs can enable a user to provide a variety of inputs associated with the application and/or view a display of information associated with the application. With increasing pressure on organizations to improve their performance, the organizations may seek to increase efficiencies related to applications supporting their business processes, for instance, by pursuing efficient resolution of events associated with UIs.

An event refers to a deviation from an intended display and/or intended functionality of a UI. For example, an event can include a deviation from a UI standard (e.g., a standard specifying display of a particular icon on a UI and/or including of a particular functionality in a UI). An event may occur as a result of an unintentional revision to instructions (e.g., instructions of the UI and/or instructions of an application utilizing the UI) and/or an intentional revision to an instruction that causes an unintended deviation from an intended display of a UI. For example, an unintentional revision to instructions can include introduction of a virus (e.g., bug), for instance, while revising the instructions and/or generating a commit. Events can include, for example, an unintended shift of a UI element (e.g., an unintended shift in a pixel location and/or relation to another UI element), an unintended change to a color of a pixel, and/or an unintended change to functionality (e.g., loss of functionality) of a UI, among other events. Given the complex nature of UI and application instructions, such as nested functionalities within instructions of applications/UIs, such unintentional revisions and/or unintended deviations may occur.

Occurrence of an event may prohibit a UI and/or an application utilizing the UI from functioning (e.g., being displayed) as intended. For example, occurrence of an event may prohibit an auto-complete functionality of a word processing application from performing properly. That is, the auto-complete function may not display auto-complete option(s) properly provided by an application to the auto-complete function. Accordingly, ensuring proper functionality of the UIs, and thus, applications utilizing the UIs can be desirable.

However, ensuring proper functionality (e.g., resolving an event) may be compounded by a delay in time between a time of occurrence of the event (e.g., a time of identification of the occurrence of the event) and a time of identifying a revision that caused the event. Development of an application and/or UI can include various revisions and/or version updates to instructions of the application and/or UI. Testing an application and/or a UI following each revision and/or version update may be impractical. Further, unintentional revisions (e.g., an erroneous revision to instructions) and/or unintended results of revisions can be difficult to test. Thus, an event, for example, a shift in a pixel and/or a change to a functionality (e.g., a seldom used functionality) caused by a revision to instructions may not be discovered until an application/UI has undergone a number of revisions and/or version updates.

Moreover, even upon discovery of an occurrence of an event, identifying a particular revision to the instructions of the UI and/or application that the caused the event (e.g., the shift in the pixel) may be expensive (e.g., time consuming), difficult, and/or inefficient. For example, the revision that caused the event may have been included in instructions of the application and/or instructions of the UI a number of revisions ago. That is, a number of previous versions may include the revision that caused the event. Due to the diverse and complex nature of today's business processes, delays in discovering an event and/or troubleshooting a UI associated with an event (e.g., resolving the event) can be challenging, complex, and/or costly. For example, a UI associated with an event may take multiple inputs (e.g., mouse clicks) and/or utilized complex input sequences to be generated. Providing such inputs and/or complex sequences may increase the challenge, complexity, and/or cost of troubleshooting a UI associated with an event.

In contrast, examples of the present disclosure include methods, systems, and computer-readable and executable instructions for comparing UIs. Comparing UIs can refer to comparing information pertaining to a portion of a UI associated with an event with information (e.g., corresponding information) pertaining to one of a plurality of previous versions of the UI and/or identifying, based on the comparison, a revision to the one of the previous versions of the UI that caused the event. A revision refers to a change (e.g., add, remove, modify, etc.) to instructions of a UI and/or a change to instructions of an application utilizing a UI. Such comparison of UIs can promote consistent and reliable resolution of events, for instance, by identifying the revision that caused the event, among other advantages. A portion of a UI refers to a particular element of a UI that is experiencing an event. A portion can include an icon (e.g., a user selectable icon having a function that is associated with an event), text, a pixel, and/or a subsection of instructions (e.g., a snippet of HTML instructions) within the instructions of the UI (e.g., instructions to generate the UI). In some examples, the portion associated with the event can include some, but not all of the elements of a version of a UI. Similarly, in some examples, the corresponding information in one of the previous versions of the UI can include a portion of the previous UI that corresponds to the portion of the UI associated with the event. Advantageously, comparing such portions (e.g., of the UI associated with the event and a corresponding portion of a previous UI) may reduce a total number of revisions that can potentially be identified as having caused the event. That is, all revisions to a previous version of a UI may not be considered as potential causes of the event. Rather, consideration can be limited to those revisions directed toward the corresponding portion of the previous version of the UI. For example, revisions to a previous UI impacting aspects of the UI that are separate and distinct from the portion of the previous UI of interest (e.g., corresponding to the portion of the UI associated with the event) may not be considered as potential causes of the event.

UIs can be compared in response to a report of an occurrence of an event. An occurrence of an event, for instance, can identified be based on an UI standard (e.g., a deviation from a UI standard), among other ways to identify an occurrence of an event. An occurrence of an event can be identified and/or reported by those supporting an application (e.g., a developer of an application and/or a UI utilized by the application) and/or by those using a user device. A user device refers to an electronic device suitable for executing a function of an application, processing information (e.g., network traffic) related to the application, and/or displaying a UI utilized by an application. Examples of user devices can include mobile phones, payment instruments, desktop/laptop computers, and/or servers, etc.

In the following detailed description of the present disclosure, reference is made to the accompanying drawings that form a part hereof, and in which is shown by way of illustration how examples of the present disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As will be appreciated, elements shown in the various examples herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features. In addition, "for example" and similar phrasing is intended to mean, "by way of example and not by way of limitation".

Figure 1:
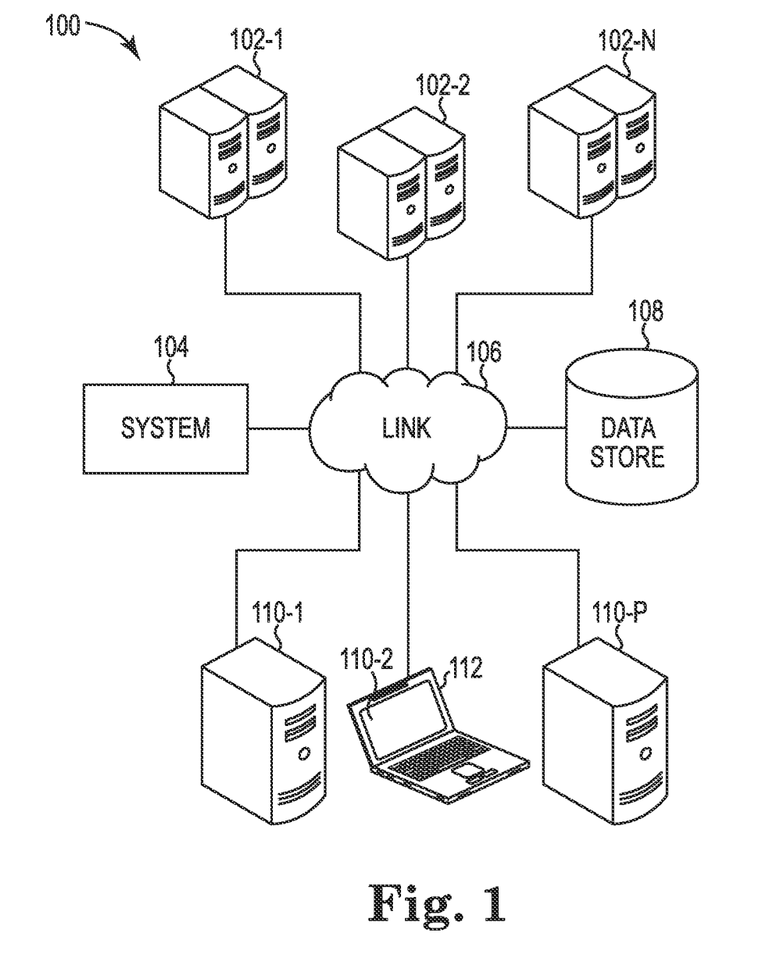
FIG. 1 illustrates an example of an environment in which various examples can be implemented for comparing user interfaces (UIs) according to the present disclosure.

FIG. 1 illustrates an example of an environment in which various examples can be implemented for comparing UIs according to the present disclosure. The environment 100 is shown to include a system 104 for comparing UIs, user devices 102-1, 102-2, . . . , 102-N, support devices 110-1, 110-2, . . . , 110-P, a data store 108, and a link 106. The data store 108 can be analogous to those discussed with respect to FIG. 3A. The system 104 can include a computing device analogous to those discussed with respect to FIG. 3B.

Comparing UIs can be performed using a support device, such as support devices 110-1, . . . , 110-P. The support devices 110-1, . . . , 110-P represent computing devices that can generate electronic data (e.g., generate a version of a UI) having browsers and/or other applications to communicate such information associated with a UI and/or having an ability to compare UIs, such as, comparing information pertaining to a portion of a UI with information pertaining to one of a plurality of previous version of the UI, among other abilities.

A UI in a support environment and/or a UI in a live environment can be associated with an event. A support environment refers to an environment that can enable support personnel (e.g., an application developer and/or UI developer) to generate a previous version of a UI (e.g., based on deployment of a previous version of the UI to the support device), compare information pertaining to a portion of a UI with information pertaining to one of a plurality of previous version of the UI, and/or modify instructions of the application and/or UI, among other abilities. Such modifications, as described herein, can be based upon comparing UIs. For example, UI located in a support environment may be under development by a developer of the UI. The developer may cause (e.g., unintentionally cause) an event by revising instructions of the UI and/or instructions of an application utilizing the UI. The developer may not report (e.g., notice) an occurrence of the event until a subsequent version of the UI and/or application. The subsequent version of the UI may have a plurality of revisions implemented therein. Accordingly, being able to identify the revision that caused the event from the plurality of revisions, for instance, by comparing UIs, can be advantageous.

A live environment refers to an environment including a user device having a UI and/or application capable of experiencing an event. The live environment can be separate and distinct from the support environment. As described herein, being separate and distinct refers to an environment being physically separate and/or having separate network resources (e.g., network resources to create network traffic) with respect to another network. In this manner, support personal (e.g., located in a support environment) can perform troubleshooting. For example, troubleshooting a UI by comparing UIs can avoid inefficiencies associated with manually identifying revisions that caused the event (e.g., providing information associated with an occurrence of an event to a UI developer that must both be present and develop troubleshooting actions in an effort to identify a revision that caused the event), among other advantages.

The support devices 110-1, . . . , 110-P can include an electronic display such as a graphical UI (GUI) 112. Similarly, in some examples, the user devices 102-1, . . . , 102-N can include an electronic display (not shown) suitable for display of electronic data.

A UI can include hardware components and/or computer-readable instruction components. For instance, hardware components can include input components (e.g., a mouse, a touch screen, and a keyboard) and/or output components (e.g., a display). An example UI can include a GUI. Such inputs can be automatically provided by an automation instruction, such as those described herein. A GUI can, for example, electronically represent an indication of a UI associated with an event (e.g., a version and/or component identification number of a UI associated with an event) and/or electronically represent an indicator of the comparison of UIs. That is, in some examples, an indicator can be displayed by a UI of a support device. For example, the indicator could be a numeric indicator, a textual indicator, and/or a color (e.g., display of the color green to indicate a particular revision is not identified as the cause of an event). Conversely, a red color could be displayed to indicate a particular version includes a revision identified as the cause of an event. Such displays can facilitate interactions between a user and a computer (e.g., allows a user to interact with a computer using images and/or text).

Link 106 (e.g., a network) represents a cable, wireless, fiber optic, or remote connection via a telecommunication link, an infrared link, a radio frequency link, and/or other connectors or systems that provide electronic communication. That is, the link 106 can, for example, include a link to an intranet, the Internet, or a combination of both, among other communication interfaces. The link 106 can also include intermediate proxies, for example, an intermediate proxy server (not shown), routers, switches, load balancers, and the like. However, the present disclosure is not so limited. That is, link 106 can represent a physical connection between the user devices 102-1, . . . , 102-N and the support devices 110-1, . . . , 110-P to communicate instructions of an application and/or instructions of a UI (e.g., instructions to generate a UI) between the support devices, the input devices, and/or the data store.

The system 104 for comparing UIs can represent different combinations of hardware and instructions to compare UIs. The system 104 for comparing UIs can include a computing device (not shown), for instance, computing device 355 as discussed with respect to FIG. 3B.

Figure 2:
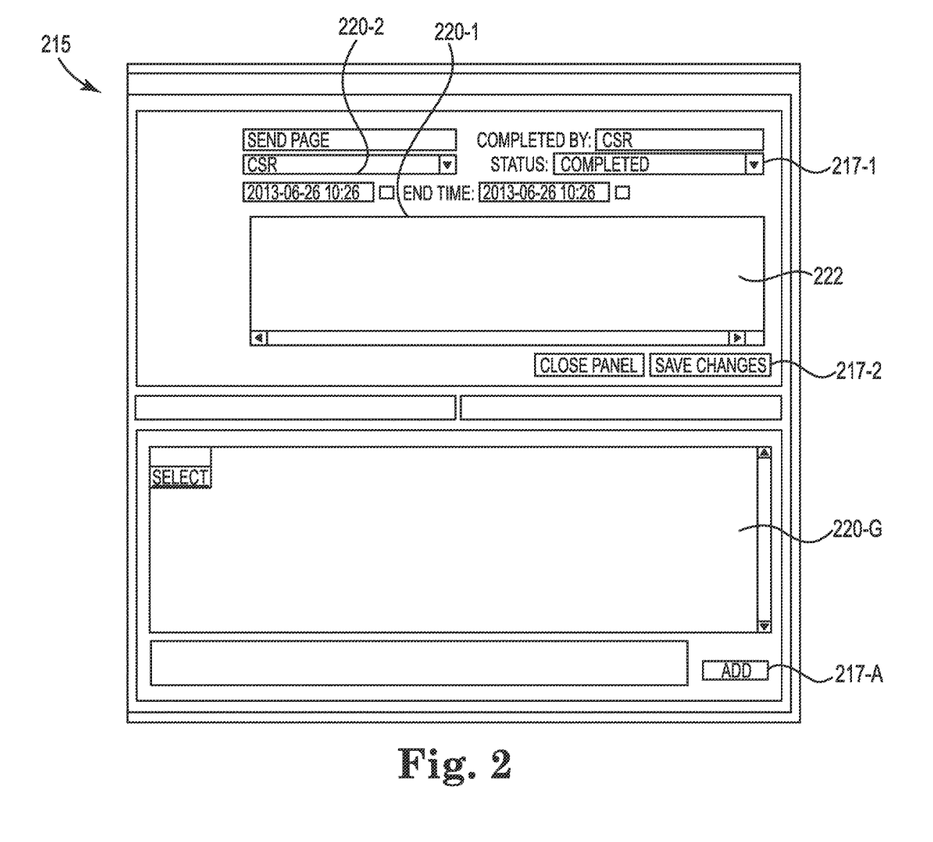
FIG. 2 illustrates a diagram of an example of a UI according to the present disclosure.

FIG. 2 illustrates a diagram of an example of a UI according to the present disclosure. The UI 215 can be displayed via a display of a support device upon receipt of an indication of a portion of the UI associated with an event. As illustrated in FIG. 2, the UI 215 can include a plurality of icons 217-1, 217-2, . . . , 217-A and/or a plurality of fields 220-1, 220-2, . . . , 220-G, among other elements included in the UI. The plurality of icons 217-1, . . . , 217-A and/or or plurality of fields 220-1, . . . , 220-G can each have a functionality (e.g., a respective functionality) associated therewith. For example, selection of an icon (e.g., 217-1) may cause the UI to perform an action (e.g., display a drop down menu, display a free text area 222, and/or cause an application utilizing the UI to perform a function. That is, the plurality of icons 217-1, . . . , 217-A and/or plurality of fields 220-1, . . . , 220-G icon can facilitate a user to interact with the UI (e.g., provide an input to cause the UI to perform the functionality).

The UI can be represented electronically be a plurality of pixels. A pixel may represent a particular section (e.g., X and Y coordinate) of a UI. The pixel can be tied to a functionality, such as those associated with an icon and/or field. The pixel can represent a style (e.g., color) of an element of the UI. However, the present disclosure is not so limited. A grouping of pixels may represent an icon, field, and/or other elements of the UI. A pixel and/or a grouping of pixels (e.g., an icon) may represent a portion of a UI associated with an event. That is, the portion of the UI associated with the event and/or the one of the previous version of the UI can include a pixel and/or a grouping of pixels, such as icon 217-1. For example, an event can include a color of a grouping of pixels, such as icon 217-1, being altered (e.g., inadvertently altered) by a revision to the UI and/or the application. Similarly, an event can include a change of a function, for example, a function of a grouping of pixels (e.g., an icon) being changed (e.g., lost) due to a revision to instructions of the UI and/or the application. Accordingly, identifying a revision that caused an event (e.g., an event to a function, a pixel, and/or the grouping of pixels) may be desirable.

Figure 3A:
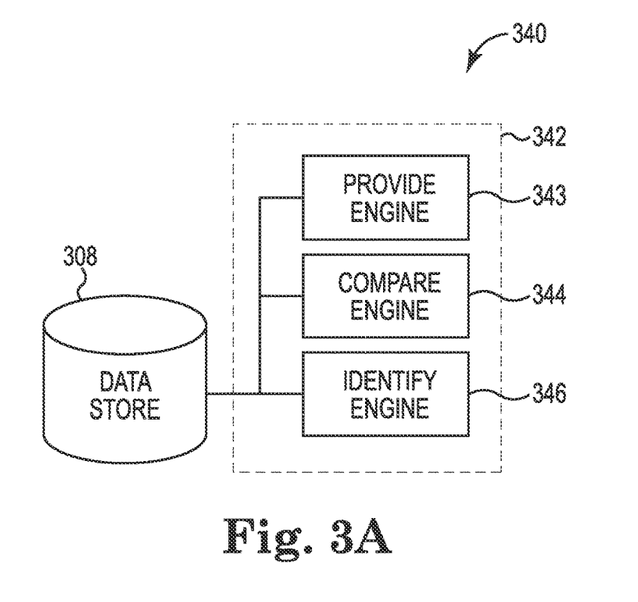
FIG. 3A illustrates a diagram of an example of a system for comparing UIs according to the present disclosure.

FIG. 3A illustrates a diagram of an example of a system for comparing UIs according to the present disclosure. The system 340 can include a data store 308 (e.g., analogous to data store 108 as referenced in FIG. 1), a comparing system 342, and/or a number of engines. The comparing system 342 can be in communication with the data store 308. The comparing system 342 can include a number of engines (e.g., provide engine 343, compare engine 344, identify engine 346, etc.). The comparing system 342 can include additional or fewer engines than illustrated to perform the various functions described herein.

The number of engines can include a combination of hardware and programming to perform a number of functions described herein (e.g., comparing information pertaining to a portion of a UI with information pertaining to one of a plurality of previous version of a UI and/or identifying a revision to the one of a plurality of previous version that caused an event based on the comparison, etc.). Each of the engines can include hardware or a combination of hardware and programming designated or designed to execute a module (e.g., a particular module). The programming can include instructions (e.g., software, firmware, etc.) stored in a memory resource (e.g., computer-readable medium) as well as a hard-wired program (e.g., logic).

The provide engine 343 can include hardware and/or a combination of hardware and programming to provide information, pertaining to a portion of a UI associated with an event. In some examples, the provide engine 343 can provide the portion of the UI associated with the event along with a report of an occurrence of the event. For instance, an indication of a portion (e.g., a particular icon and/or functionality) of the UI associated with the event can be provided along with a report of an occurrence of an event.

The provide engine can provide information (e.g., pertaining to a portion of the Up upon receipt of an indication of the portion of a UI associated with an event. Such an indication can be received by a receive engine (not illustrate) and can include, for example, information pertaining to the portion of the UI such as a section of a screen shot of the UI, a snippet of the instructions to generate the UI, and/or a functionality of a plurality of functionalities of the UI.

The indication received by the receive engine (not shown) can include identifying information, for instance, identifying a version of the UI associated with the event and/or a suspected version of one of the previous versions of the UI in which the revision that caused the event was first included (e.g., instructions for the revision were first input into the instructions to generate that UI and/or first activated). The indication can, in some examples, include a timeframe (e.g., day, month, and/or amount of time from implementation of the version of the UI associated with the event, etc.) associated with the plurality of previous version in that the revision that caused the event may be included. For example, the indication can include a number of previous versions of the UI that occurred during a particular timeframe, for example, within a given month, that can be compared with the UI associated with the event. In some examples, the compare engine can iteratively compare information pertaining to a portion of the UI associated with the event with the information pertaining to one of a plurality of previous versions of the UI included in a timeframe (e.g., a timeframe included in the indication of the UI associated with the event) until the revision that caused the event is identified (e.g., a revision to one of the plurality of previous versions of the UI included in the timeframe).

The compare engine 344 can include hardware and/or a combination of hardware and programming to instructions to compare the information pertaining to the portion of the UI with information pertaining to one of a plurality of previous versions of the UI. The information pertaining to the portion of the UI can include visual information, such as a screen shot of the UI, instructions to generate the UI, and/or functional information, such as whether a function intended to be provided by the UI is functioning properly. Similarly, the information pertaining to one of the previous versions of the UI can include visual information pertaining to the previous version of the UI, such as a screen shot of the previous version of the UI, instructions to generate the UI, and/or functional information, such as whether a function intended to be provided by the previous version of the UI is functioning properly.

In some examples, the instructions to compare can include instructions executable by the processing resource to compare the information pertaining to the portion of the UI with corresponding information pertaining to a corresponding portion of the one of the previous versions of the UI.

A corresponding portion refers to a portion of a previous version of the UI that corresponds to the portion of the UI associated with the event. For example, portion of the UI associated with an event can include a grouping of pixels representing an "add" icon and/or a functionality associated with the "add" icon. In such an example, a corresponding portion of a previous version can include a corresponding grouping of pixels representing an "add" icon and/or functionality associated with the "add" icon in the previous version of the UI. However, the present disclosure is not so limited. That is the corresponding portion can include a pixel, a grouping of pixels, a section of a screen shot of a UI, a snippet of instructions to generate the UI (e.g., to generate a portion of a UI), a functionality of a plurality of functionalities provided by a UI, among other portions of the previous version of the UI the correspond to the portion of the UI associated with the event.

The compare engine 344 can compare instructions to generate the portion of the UI with instructions to generate a corresponding portion of one of a plurality of previous versions of the UI. In some examples, the instructions can include HyperText Markup Language (HTML) instructions. The compare engine 344 can, in some examples, compare HTML instructions to generate the portion of the UI associated with the event with HTML instructions to generate the corresponding portion of the one of the previous versions.

Comparing the instructions to generate a portion of a previous version of a UI with instructions to generate a portion of a UI can include the compare engine 344 accessing instructions from a data store. That is, the instructions can be stored in a data store, for example, along with a commit history, as described herein. The compare engine 344 can compare the instructions to generate the portion of the UI with the instructions to generate the corresponding portion of the one of the previous versions of the UI upon request (e.g., initiated by an IT administrator) and/or upon an occurrence of an event (e.g., immediately upon a loss of a functionality within the UI). In some examples, the compare engine 344 can compare visual information representing the portion of the UI (e.g., a section of a screen shot of the UI) with visual information representing a corresponding portion (e.g. a section of a screen shot of the one of the previous versions of the UI) of the one of the previous versions of the UI.

The identify engine 346 can include hardware and/or a combination of hardware and programming to identify a revision, to the instructions to generate the corresponding portion, which caused the event based on the comparison (e.g., a comparison by the compare engine 344). Identifying refers to recognition of a difference, such as a difference between the information pertaining to the portion of the UI associated with the event and information pertaining to a corresponding portion of a previous version of the UI. The identify engine can, in some examples, identify the revision based on a difference between the visual information representing the portion of the UI and the visual information representing the corresponding portion of the one of the previous versions.

In some examples, the identify engine 346 can to identify a previous version, of the previous versions, which first included the revision that caused the event. For instance, the identify engine can, iteratively identify, based on iterative comparison, whether a particular version of the previous versions includes a particular revision. The iterative identification can proceed (e.g., in reverse chronological order) until a previous version of the previous version is identified to have first included the revision (e.g., prior previous versions do not include the particular revision).

In some examples, the identify engine 346 can identify a revision from of a plurality of revisions stored in a commit history including a plurality of commits storing the plurality of revisions. A commit history refers to a plurality of commits that record a plurality of revisions to instructions of a UI and/or an application. That is, the plurality of commits can include some or all of a total number of revisions implemented in the instructions of the UI and/or the application. Such commits, while numerous, can potentially aid a developer of the UI and/or the application. For example, commits may provide developers of the UI and/or the application with an audit trail that can be used, for example, to understand runtime behavior of an UI and/or facilitate diagnosis and/or troubleshooting by comparing UIs, as described herein. Commits can be, for example, automatically generated based on an occurrence of a checkpoint (e.g., implementing a new version of a UI) and/or manually (e.g., periodically during development of a UI by a developer of the UI). A commit may be utilized to identify a revision included therein that caused the event to occur, as described herein. In some examples, each revision to the instructions of the UI and/or the instructions of the application can be included in the commit history.

Figure 3B:
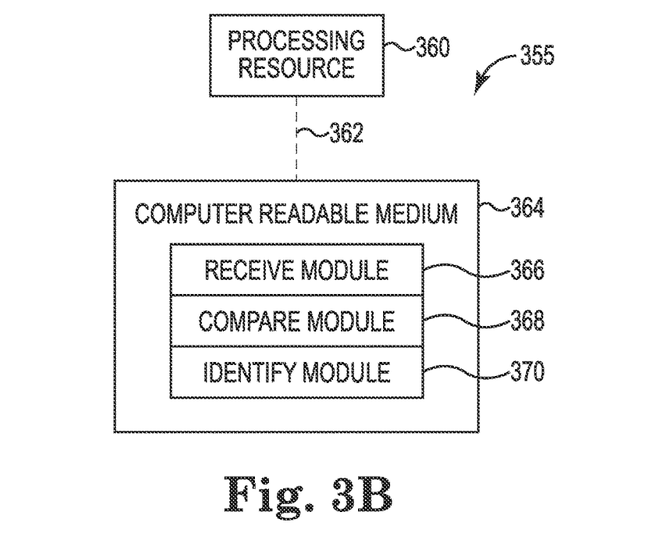
FIG. 3B illustrates a diagram of an example of a computing device for comparing UIs according to the present disclosure.

FIG. 3B illustrates a diagram of an example of a computing device for comparing UIs according to the present disclosure. The computing device 355 can utilize software, hardware, firmware, and/or logic to perform a number of functions described herein.

For example, the computing device 355 can be a combination of hardware and instructions for comparing UIs. The hardware, for example can include a processing resource 360 and/or a memory resource 364 (e.g., computer-readable medium (CRM), database, etc.) A processing resource 360, as used herein, can include a number of processors capable of executing instructions stored by a memory resource 364. Processing resource 360 can be integrated in a single device or distributed across multiple devices. The instructions (e.g., computer-readable instructions (CRI)) can include instructions stored on the memory resource 364 and executable by the processing resource 360 to implement a desired function (e.g., compare the information pertaining to the portion of the UI with information pertaining to one of a plurality of previous versions of the UI, etc.).

The memory resource 364 can be in communication with a processing resource 360. A memory resource 364, as used herein, can include a number of memory components capable of storing instructions that can be executed by processing resource 360. Such memory resource 364 can be a non-transitory CRM. Memory resource 364 can be integrated in a single device or distributed across multiple devices. Further, memory resource 364 can be fully or partially integrated in the same device as processing resource 360 or it can be separate but accessible to that device and processing resource 360. Thus, it is noted that the computing device 355 can be implemented on a support device and/or a collection of support devices, on a user device and/or a collection of user devices, and/or on a combination of the support devices and the user devices.

The memory resource 364 can be in communication with the processing resource 360 via a communication link (e.g., path) 362. The communication link 362 can be local or remote to a computing device associated with the processing resource 360. Examples of a local communication link 362 can include an electronic bus internal to a computing device where the memory resource 364 is one of volatile, non-volatile, fixed, and/or removable storage medium in communication with the processing resource 360 via the electronic bus.

The memory resource 364 can include a number of modules such as a receive module 366, a compare module 368, and a identify module 370. The number of modules 366, 368, 370 can include CRI that when executed by the processing resource 360 can perform a number of functions. The number of modules 366, 368, 370 can be sub-modules of other modules. For example, the compare module 368 and the identify module 370 can be sub-modules and/or contained within the same computing device. In another example, the number of modules 366, 368, 370 can comprise individual modules at separate and distinct locations (e.g., CRM, etc.).

Each of the number of modules 366, 368, 370 can include instructions that when executed by the processing resource 360 can function as a corresponding engine, including those as described herein. For example, the receive module 366 can include instructions that when executed by the processing resource 360 can function as the receive engine (not shown), for instance, to receive an indication of a portion of a UI associated with an event. The indication can include information pertaining to the portion of the UI. Similarly, the compare module 368 can include instructions that when executed by the processing resource 360 can function as the compare engine 344 to compare the information pertaining to the portion of the UI with information pertaining to one of a plurality of previous versions of the UI. The identify module 368 can include instructions that when executed by the processing resource 360 can function as the identify engine 346 to identify, based on the comparison, a revision to one of the previous versions of the UI that caused the event.

Figure 4:
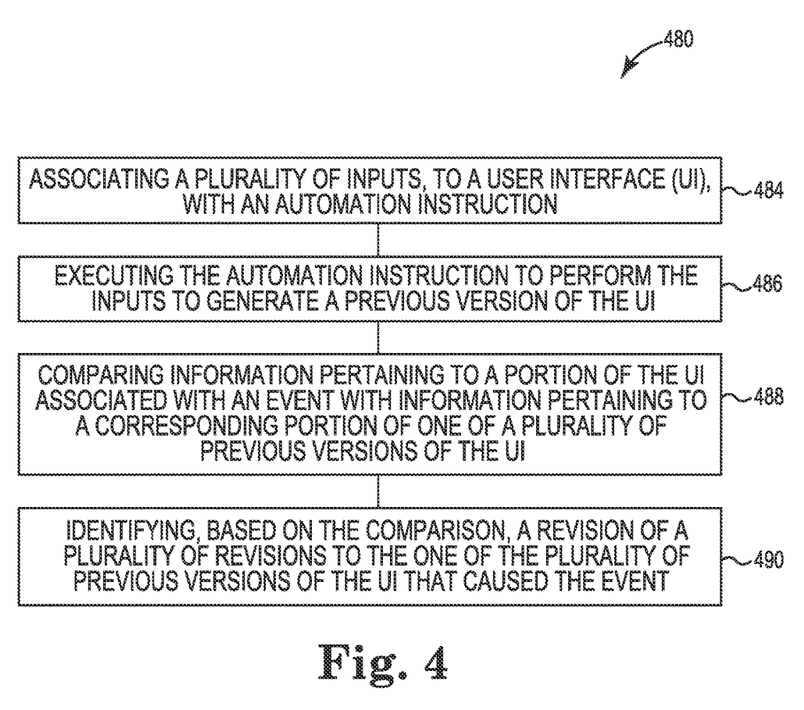
FIG. 4 illustrates a flow diagram of an example of a method for comparing UIs according to the present disclosure.

FIG. 4 illustrates a flow diagram of an example of a method for comparing UIs according to the present disclosure. As shown at block 484, in various examples, the method 480 can include associating a plurality of inputs, to a UI, with an automation instruction. Associating can include creation of an automation instruction capable of performing a plurality of inputs to a UI. An automation instruction (e.g., an automation script) refers to an instruction(s) that can be utilized to generate a previous version of a UI and/or perform a given application function automatically (e.g., without a user input). Examples of automation instructions include UI automation instructions and/or application programming interface (API) automation instructions, among other types of automation instructions. Specific examples of automation instructions can be found in Selenium and/or TruClient™, among other automation programs including automation instructions. For instance, as shown at block 486, the method can include executing the automation instruction to perform the inputs to generate a previous version of the UI.

In various examples, the method 480 can include comparing information pertaining to a portion of the UI associated with an event with information pertaining to a corresponding portion of one of a plurality of previous versions of the UI, as shown at block 488. Comparing can, in some examples, include automatically causing the support device to compare UIs using UI automation instructions, among other types of automation instructions. A UI automation instruction refers to instructions to automatically provided UI inputs, for example, an input to select an icon having a functionality associated therewith and/or inputting user credentials to perform a particular function of the UI. In some examples, the method 480 can include executing an automation instruction to automatically compare a functionality of a previous UI with a functionality provided by the UI associated with the event. That is, such a comparison can be accomplished without an UI input (e.g., mouse clicks, audio inputs, tactile inputs, etc.) from a user. For instance, a functionality (e.g., an auto complete functionality) of a field can be tested using an automation instruction to identify whether the functionality is working properly (e.g., as intended). Comparing UIs without reliance on availability of such an input (e.g., a user to provide the input) can promote consistent, effective, and/or efficient event troubleshooting.

In some examples, the method 480 can include comparing the information pertaining to the portion of the UI associated with the event with information pertaining to a corresponding portion of a particular previous version included in a report of the event. For example, a report may indicate a particular version (e.g., version 8) of a total number of previous versions (e.g., 20 total versions) that a user (e.g., a developer) believes to be either a first of the previous versions to include the revision and/or a last of the previous versions to be without the revision. For instance, information pertaining to the portion of the UI associated with the event can be compared with information pertaining to a corresponding portion of a particular previous version of the UI. In some examples, comparison can include iteratively comparing the information pertaining to the UI associated with the event with the information pertaining to the one of the previous versions until the revision caused the event is identified. For example, by comparing with the particular previous version and continuing to compare with different previous versions, until a version including the revision that cause the event is identified. Such iterative comparison can include comparing the with the plurality of previous versions in a reverse chronological order until the revision that cause the event is identified based on the comparison.

That is, the method 480 can include identifying, based on the comparison, a revision of a plurality of revisions to the one of the previous versions of the UI that caused the event, as shown at block 490. For example, the revision can be identified from a commit included in commit history including a plurality of commits, as described herein.

In some examples, the method 480 can include causing the support device to display an electronic representation indicative of the comparison. Causing can include executing instructions stored in memory to directly cause a support device to display, for example, an electronic representation indicative of the comparison and/or to communicate data with an expectation that it be processed by another device to cause the support device to display then electronic representation indicative of the comparison. Similarly, blocks 484, 486, 488, and 490 can include executing instructions stored in memory to perform the examples of the method described therein.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 308 in FIG. 3.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A non-transitory computer-readable medium storing a set of instructions executable by a processing resource to:
    receive an indication of a deviation occurring in a current version of software, wherein the deviation includes a deviation from an intended display of a user interface (UI) or a deviation from an intended functionality of the UI;
    receive an indication of a portion of the UI associated with the deviation;
    compare information pertaining to the portion of the UI in the current version with information pertaining to a corresponding portion of the UI in a plurality of previous versions of the software, wherein the instructions to compare include instructions executable by the processing resource to:
        determine the plurality of previous versions from previous versions of the software that were created in a particular time frame; and
        iteratively compare the information pertaining to the portion of the UI in the current version with the information pertaining to the corresponding portion of the UI in the previous versions starting with a most recent version until a code revision, which pertains to the portion of the UI, causing the deviation is identified; and
    identify, based on the comparison, the code revision causing the deviation.

2. The medium of claim 1, wherein the instructions to compare include instructions executable by the processing resource to compare visual information representing the portion of the UI with visual information representing the corresponding portion in the plurality of previous versions.

3. The medium of claim 2, wherein the instructions to identify include instructions to identify the revision based on a difference between the visual information representing the portion of the UI and the visual information representing the corresponding portion in the plurality of previous versions.

4. A system, comprising a processing resource in communication with a non-transitory computer-readable medium having instructions executable by the processing resource to implement:
    a provide engine to provide information, pertaining to a portion of a user interface (UI) associated with a deviation occurring in a current version of software, wherein the deviation includes a deviation from an intended display of the UI or a deviation from an intended functionality of the UI;
    a compare engine to compare instructions to generate the portion of the UI with instructions to generate a corresponding portion of the UI in a plurality of previous versions of the UI, wherein the instructions executable by the processing resource to implement the compare engine further comprise instructions to:
        determine the plurality of previous versions from previous versions that were created in a particular time frame; and
        iteratively compare the instructions to generate the portion of the UI with instructions to generate the corresponding portion of the UI in the previous versions starting with a most recent version until a code revision, which pertains to the portion of the UI, causing the deviation is identified; and
    an identify engine to identify the code revision causing the deviation, based on the comparison.

5. The system of claim 4, including instructions to implement the identify engine to identify a particular previous version, of the plurality of previous versions of the UI, which first included the revision that caused the deviation.

6. The system of claim 4, including instructions to implement the identify engine to identify the revision from a plurality of revisions stored in a commit history.

7. The system of claim 4, including instructions to implement the provide engine to provide the information pertaining to the portion of the UI associated with the deviation along with a report of an occurrence of the deviation.

8. The system of claim 4, including instructions to implement the compare engine to compare HyperText Markup Language (HTML) instructions to generate the portion of the UI associated with the deviation with HTML instructions to generate the corresponding portion of the plurality of previous versions.

9. A method, comprising:
    associating a plurality of inputs, to a user interface (UI), with an automation instruction;
    executing the automation instruction to perform the inputs to generate a current version of the UI;
    receiving an indication of a deviation occurring in the current version of the UI, wherein the deviation includes a deviation from an intended display of the UI or a deviation from an intended functionality of the UI;
    receiving an indication of a portion of the UI associated with the deviation;
    comparing information pertaining to the portion of the UI associated with the deviation with information pertaining to a corresponding portion of the UI in a plurality of previous versions of the UI; wherein comparing comprises:
        determine the plurality of previous versions from previous versions that were created in a particular time frame; and
        iteratively compare the information pertaining to the portion of the UI with the information pertaining to the corresponding portion of the UI in the previous versions starting with a most recent version until a code revision, which pertains to the portion of the UI, causing the deviation is identified; and
    identifying, based on the comparison, the code revision causing the deviation.

10. The method of claim 9, wherein the method includes displaying an electronic representation indicative of the comparison.

11. The method of 9, wherein identifying includes identifying the revision that caused the deviation from a commit associated with the one of the plurality of previous versions.

12. The method of claim 9, wherein comparing includes executing an automation instruction to automatically compare a functionality of a previous version of the UI with a functionality provided by the UI associated with the deviation.

13. The method of claim 9, wherein comparing includes comparing the information pertaining to the portion of the UI associated with the deviation with information pertaining to a corresponding portion of a particular previous version of the UI included in a report of the deviation.

\* \* \* \* \*